(12) United States Patent
Esberger et al.

(10) Patent No.: US 11,946,473 B2
(45) Date of Patent: Apr. 2, 2024

(54) METHOD AND SYSTEM FOR MONITORING MOVING ELEMENTS

(71) Applicants: Adam Esberger, Winchester (GB); Michael Yuratich, Hamble (GB); Andrew Jewell, Bracknel (GB)

(72) Inventors: Adam Esberger, Winchester (GB); Michael Yuratich, Hamble (GB); Andrew Jewell, Bracknel (GB)

(73) Assignee: Magnetic Pumping Solutions LLC, Houston, TX (US)

( * ) Notice: Subject to any disclaimer, the term of this patent is extended or adjusted under 35 U.S.C. 154(b) by 0 days.

(21) Appl. No.: 17/318,175

(22) Filed: May 12, 2021

(65) Prior Publication Data

US 2021/0270123 A1   Sep. 2, 2021

Related U.S. Application Data

(63) Continuation-in-part of application No. 16/631,865, filed as application No. PCT/US2018/043308 on Jul. 23, 2018, now Pat. No. 11,002,280.

(60) Provisional application No. 62/535,920, filed on Jul. 23, 2017.

(51) Int. Cl.
| | | |
|---|---|---|
| F04D 13/10 | (2006.01) |
| E21B 47/008 | (2012.01) |
| F04D 15/00 | (2006.01) |
| G01D 5/14 | (2006.01) |
| G01P 3/487 | (2006.01) |
| G01P 13/04 | (2006.01) |

(52) U.S. Cl.
CPC ............ F04D 13/10 (2013.01); E21B 47/008 (2020.05); F04D 15/0066 (2013.01); F04D 15/0088 (2013.01); G01D 5/145 (2013.01); G01P 3/487 (2013.01); G01P 13/045 (2013.01); F04B 2203/0209 (2013.01)

(58) Field of Classification Search
CPC ....... G01D 5/145; G01P 3/487; G01P 13/045; G01P 3/443; F04D 13/10; F04D 15/0066; F04D 15/0088; F04B 2203/0209; E21B 47/008
See application file for complete search history.

(56) References Cited

U.S. PATENT DOCUMENTS

| | | | |
|---|---|---|---|
| 4,319,188 A * | 3/1982 | Ito ..................... | G01D 5/24404 324/207.21 |
| 4,525,670 A * | 6/1985 | Miyagawa .............. | G01P 3/487 310/168 |
| 4,783,609 A * | 11/1988 | Sugiyama ............... | G01P 3/487 310/168 |
| 5,998,989 A * | 12/1999 | Lohberg .................. | G01P 3/487 324/207.21 |
| 11,002,280 B2 * | 5/2021 | Esberger ................... | E21B 4/04 |
| 2010/0247335 A1 * | 9/2010 | Atherton ................ | H02K 11/21 702/141 |
| 2012/0257995 A1 * | 10/2012 | True ........................ | F04B 35/04 417/410.1 |

* cited by examiner

Primary Examiner — Charles G Freay
(74) Attorney, Agent, or Firm — Matthew J Patterson (57) ABSTRACT

An apparatus and method for sensing a rotational parameter of a rotating member of a downhole pumping system. The apparatus is capable of detecting motor rotation and pump operating conditions and includes control systems for methods utilizing the rotational parameters to control the operation of the downhole pumping system.

20 Claims, 9 Drawing Sheets

METHOD AND SYSTEM FOR MONITORING MOVING ELEMENTS

CROSS REFERENCE TO RELATED APPLICATIONS

This application claims the benefit of U.S. Provisional Patent Application Ser. No. 62/535,920 filed 23 Jul. 2017, Patent Cooperation Treaty Patent Application Serial No PCT/US18/43308 filed 23 Jul. 2018 and is a continuation-in-part of U.S. patent application Ser. No. 16/631,865 filed 17 Jan. 2020. The disclosures of the applications above are incorporated herein by reference in their entirety.

BACKGROUND OF THE DISCLOSURE

Field of the Disclosure

Embodiments of the present disclosure to downhole pumping systems used to pump fluids from wells and, and more particularly, to a method and system for detection, correction and monitoring of the rotational movement of an electric motor as part of a downhole pumping system.

Description of the Related Art

Electric Submersible Pumping (ESP) is a widely used method of artificial lift, whereby a pump and an electric motor are deployed in a borehole and are used to bring fluids, including liquid and gas, to the surface. Artificial lift is necessary when the natural well pressure is insufficient to do so by itself. The motor is powered via a length of electric cable rising to surface and thence connected to control equipment. Injection pumping is also used in the art whereby a pump and electric motor deployed in a borehole are used to inject fluids and solids (such as proppants) into a formation. Although induction type motors are dominant in the field of ESPs, permanent magnet motors are becoming more common and have a different set of problems to be solved to ensure safe and reliable control.

It has been found that achieving reliable operation of ESPs and optimum production is greatly assisted by downhole gauges. A typical gauge will include a sensor to measure the motor internal temperature, which allows the motor to be protected by stopping it if it gets too hot. Such a gauge will include a sensor to measure the pump intake pressure, which is the reservoir flowing pressure (pressure where fluid enters the borehole) referred to the intake. Controlling the pump to regulate intake pressure therefore regulates production. If the intake pressure drops too low it indicates insufficient fluid above the intake, with the possibility for the pump to run dry. This warning allows the pump to be stopped or slowed down using the surface control equipment. Less commonly, despite its benefits, a discharge pressure sensor is fitted. This discharge pressure sensor gives the pressure of the fluid column above the pump and allows the pressure head across the pump (the difference of discharge and intake pressures) to be determined.

The process of installing a downhole pumping system is complex and entails several steps at which a three-phase power electrical joint, typically comprised of a connector, bolted or spliced must be made. Over many decades of experience there still remains a significant probability that the motor will turn in the wrong direction when first started due to mis-phasing of the three-phase power electrical joint. Even with best practice the possibility of incorrect rotation must be allowed for.

Another important aspect of controlling downhole pumping systems is the controlling of the speed of the motor. It is known in the art that measuring and reporting the angle of the rotating shaft of the motor is a very important parameter for robust and efficient control of permanent magnet motors. Most such control methods use techniques from the known broad family of vector control algorithms. In some submersible pumping applications, the angle must be estimated in the drive from surface voltage and current using an algorithm known in the art as an observer or estimator. Operating a drive using estimated angle is also known as sensorless control. In other industrial applications, such as robotics, it is usually feasibly to connect an angle encoder to the shaft and not rely on sensorless control, as this gives the maximum robustness to rapid changes of load. However, in downhole pumping systems fitted with a conventional downhole gauge, the downhole gauges do not have the bandwidth to transmit shaft angle at a sufficiency high rate for sensor control.

When no gauge is fitted, then at start up, or after a restart, it is necessary to wait for the estimated time for fluid to arrive at surface before it can be determined whether the pump is rotating in the correct direction. It should be noted that such pumps used in in ESP systems are predominantly centrifugal type pumps. The nature of such pumps is that even when rotated in the wrong direction they will pump fluid until a significant head is reached, albeit not normally enough to produce fluid at surface. Hence even when a discharge pressure measurement is made, and increasing pressure indicates fluid flow, it is not possible to immediately determine whether the pump is rotating in the wrong direction.

Another problem in the prior art, and in particular with unconventional wells (shale formations for example), the ESP is often set in the sensibly horizontal section of the well. In such cases, the discharge pressure will not rise appreciably until the lifted fluid has entered the non-horizontal section, further delaying the ability to detect reverse rotation of the pump.

One practical result of a pump starting in the reverse direction is wasted time, which is very costly considering all the personnel and equipment tied up while waiting to know if the equipment is operating correctly or if it has to be recovered from the well. These costs are even higher for offshore operations, but often there is a further issue offshore. Typically, much larger pumps are used, and the pump bearings experience high rubbing loads when running reversed. These can lead to premature failure and large expense in lost production and workover to replace the pump.

In unconventional wells or wells that produce a lot of sand, it is important not to stop a running motor unless absolutely necessary. These wells contain much debris which is pumped up into the production tubing. When the pump stops, the debris falls back down the production tubing and into the pump and can cause it to seize or otherwise become damaged. Unconventional wells are typically deep and workover (repair) costs are extremely expensive. During start-up, a method that shortens the time to discovering reverse rotation and correcting it greatly reduces the initial amount of debris that can fall back down the production tubing and into the pump.

Progressive cavity pumps (PCPs) are another type of pump that can be driven by electric motors in ESP systems, with the motor and pump being deployed in the borehole. PCPs are positive displacement and operate equally well in either sense of rotation in terms of pumping capability.

Reverse rotation at start has the almost immediate effect of running the pump dry unless fluid has previously entered the production tubing that the pump is discharging into. Of course, once the fluid from the production tubing has been pumped out into the wellbore the PCP will be pumped dry. It is well known that a PCP will typically be damaged within a couple of minutes when run dry.

There is clearly a need for an improved means of detecting reverse rotation of an ESP system at start up and the capability of acting on it promptly. The present disclosure described herein below provides method and apparatus to accomplish this and additional benefits for ESP operations, independent of motor type and surface drive type.

SUMMARY OF THE DISCLOSURE

In accordance with some aspects of the present disclosure, systems and methods related to a novel downhole pumping system are disclosed. Various embodiments of a downhole pumping system incorporating a rotational movement sensor and control system are disclosed.

According to one aspect of the present disclosure, the downhole pumping system includes an electrical submersible pump assembly that includes a motor, a shaft, a pump, and at least one sensor system positioned to measure a rotational parameter of the shaft. The system includes a processing system to determine a measurement of the rotational parameter and determines if the shaft is rotating, the direction of rotation, the speed of rotation and the acceleration of rotation of the shaft. The system may include a control system to control the rotational movement of the shaft in accordance with the rotational parameter.

According to another aspect of the present disclosure, a method of controlling a downhole pumping system is disclosed. The method includes a desired rotational direction of the shaft and determining a rotational parameter of the shaft from the at least one sensor system including determining if the shaft is rotating, in which direction the shaft is rotating, the speed that the shaft is rotating and the acceleration of the shaft. The method further includes controlling the rotation of the shaft based on the rotational parameter and the desired rotational direction.

According to yet another aspect of the present disclosure, a method determining a condition of the downhole pumping system is disclosed. The method includes determining whether the pump is in a stalled condition, a backspin condition, a speed fluctuation condition, a stuck condition, a stopped condition, or a constant speed condition.

Another general aspect includes a rotational transmitter assembly that may include a cylindrical body having a first end configured to fixedly attach to a shaft of a motor, a second end having an end face, a circumferential face positioned on an outer surface of the cylindrical body and a pocket positioned within the circumferential face; a permanent magnet configured to produce a magnetic field positioned in the pocket substantially flush with the circumferential face and a stationary sensor assembly fixedly attach to a stationary portion of the motor may include a sensor configured to sense the magnetic field, the sensor positioned proximate the circumferential face. Other embodiments of this aspect include corresponding computer systems, apparatus, and computer programs recorded on one or more computer storage devices, each configured to perform the actions of the methods.

Another general aspect includes an apparatus an electrical submersible pump assembly that may include a motor, having a housing and a shaft, the shaft having a shaft axis, a first end and a second end, a pump, mechanically coupled to the first end, and a sensor system that may include a rotational transmitter assembly that may include a cylindrical body having a first end configured to fixedly attach to the shaft of the motor, a second end having an end face, a circumferential face positioned on an outer surface of the cylindrical body and a pocket positioned within the circumferential face, a permanent magnet configured to produce a magnetic field positioned in the pocket substantially flush with the circumferential face and a stationary sensor assembly fixedly attach to a stationary portion of the motor may include a sensor configured to sense the magnetic field, the sensor positioned proximate the circumferential face and where the sensor system is configured to output a signal related to a rotational parameter of the shaft.

Yet another general aspect includes a method for controlling an electrical submersible pump assembly. The method also includes positioning a rotational transmitter assembly on a shaft of a motor where the rotational transmitter assembly may include a cylindrical body having a first end configured to fixedly attach to the shaft, a second end having an end face, a circumferential face positioned on an outer surface of the cylindrical body and a pocket positioned within the circumferential face and a permanent magnet having a magnetic field may include a first polarity and a second polarity where the first polarity is opposite from the second polarity, the permanent magnet positioned in the pocket substantially flush with the circumferential face. The method also includes positioning a stationary sensor on a housing of the motor proximate the circumferential face. The method also includes starting the motor. The method also includes attempting to sense a magnetic field using the stationary sensor. The method also includes determining a rotational parameter of the motor. Other embodiments of this aspect include corresponding computer systems, apparatus, and computer programs recorded on one or more computer storage devices, each configured to perform the actions of the methods.

Further areas of applicability will become apparent from the description provided in this disclosure. It should be understood that the disclosure and specific examples provided are for illustrative purposes and do not limit the scope of the present disclosure.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Figure 1:
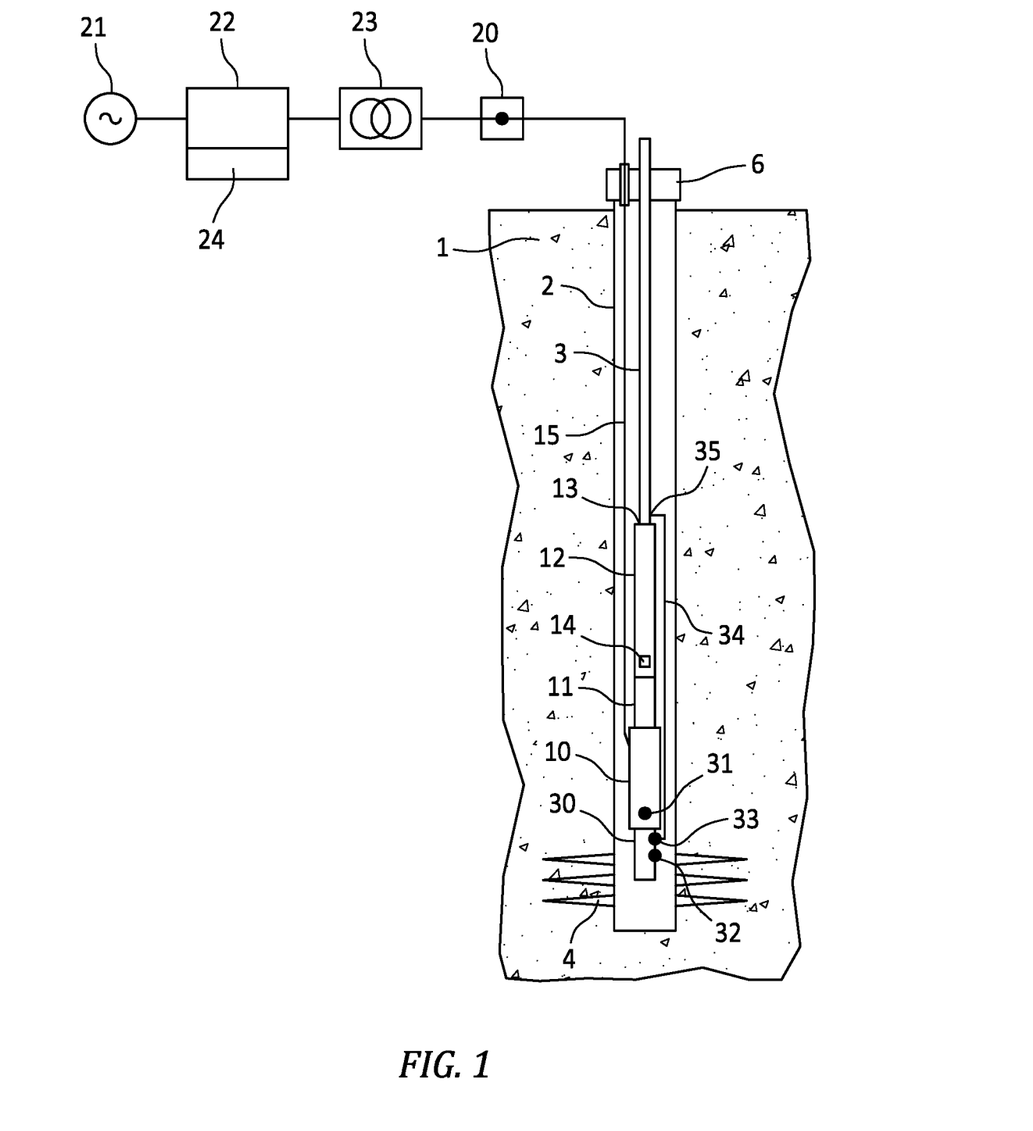
FIG. 1 is a schematic representation of a downhole pumping system in accordance with the present disclosure.

Referring to FIG. 1, there is shown a typical downhole pumping system installed in a wellbore. As is known, a borehole drilled in an earth formation 1 may be lined with casing 2 cemented to the surrounding formation. A motor 10 is coupled to a pump 12 via a motor seal 11. The pump discharge end 13 is attached to production tubing 3. Production fluid (not shown) enters the well via perforations 4 in the casing 2 and enters the pump at its pump intake 14. The production tubing 3 runs up the borehole through the wellhead 6 and on to surface production facilities. In a typical installation, motor 10 comprises a three-phase motor and is powered via a cable 15 which comprises a three-conductor electric cable, which runs up to surface alongside and clamped to the production tubing 3 in a manner well known in the art. The cable 15 then penetrates through the wellhead 6 and runs to a vented junction box 20. In the embodiment shown, surface electric power 21 is converted by drive unit 22 to a frequency and scaled voltage needed by the motor 10. The scaled voltage is then increased to the actual voltage needed by the motor 10, allowing for voltage drop in the cable, by transformer 23. The output of the transformer 23 is connected in the vented junction box 20 to the cable 15. In other embodiments, older installations for example, drive unit 22 may simply comprise a switch-board that passes the supply voltage directly to the transformer via a controllable contactor and protective fuses. In the current area of art, drive unit 22 is preferably a variable speed drive as this permits optimization of production and energy savings. A variable speed drive is in any case required for permanent magnet motors due to the need for synchronous control. A controller 24, whether separate or incorporated within the drive unit 22, can be configure to cause the motor to stop and start and potentially to reverse the motor rotational direction by switching phase connections electronically or by switchgear as will be discussed more fully herein below.

In some wells, the casing 2 to production tubing 3 annulus is sealed above the motor 10 to prevent gas entering the casing. The seal (not shown) is well known in the art and is typically referred to as a packer. In this particular case, the cable 15 has to make a further penetration through the packer. It is well known in the art that cable electrical connections are made on either side of the packer penetrator.

Still referring to FIG. 1, downhole gauge 30 is attached to the motor 10. Downhole gauge 30 contains electronics and usually has connections from its interior into the motor 10, which can be oil-filled, and to sensors mounted outside the gauge unit. Such sensors can include vibration and internal temperature sensors. A temperature sensor 31 can be fitted inside the motor 10 and connected to the downhole gauge 30, and a pressure sensor 32 to sense the pressure of the fluid surrounding the gauge. It is known in the art that the measured pressure is easily related to the pump intake pressure using estimated fluid density and the vertical height (elevation) between the pressure sensor 32 and the pump intake 14. If required, a second pressure sensor 33 can be used, connected by a sense tube 34 to a port in the production tubing immediately above the pump discharge end 13. This, again with a suitable known adjustment for elevation, is the discharge pressure measurement. In practice, the adjustments in pressure are small and rarely made.

Considering now the practical aspects of connecting the motor 10 to the drive unit 22, it can be seen that potential errors may be made in the sequence of phase connections at the motor, at any splices in the cable (not shown), at and below the well head penetration, and in the junction box 20. With the aforementioned downhole seal penetrator there exists two more such connections wherein potential errors may be made. Since the motor 10 is fully enclosed and deployed in the well, there is no possibility to check if connections have been swapped at some point in the lengthy sequence of actions followed to install such a system. Since errors are inevitably made, from time-to-time it is difficult to predict whether the motor 10 will start in the correct rotational direction. Although the pumping system shown in FIG. 1 illustrates an ESP type pump, alternative pumps and pumping schemes (other than lifting) may be used without departing from the scope of the present disclosure. For instance, embodiments of the present disclosure are well suited for use with injection pumping systems wherein the desired rotational direction of the motor will be opposite of that for a pumping system. In addition, the desired rotational direction of the motor will depend directly on the configuration of the pump and motor, i.e. their relational mounting scheme. In addition, a progressive cavity pump (PCP) when reversed will indeed pump fluid from the production tubing into the well.

Figure 2:
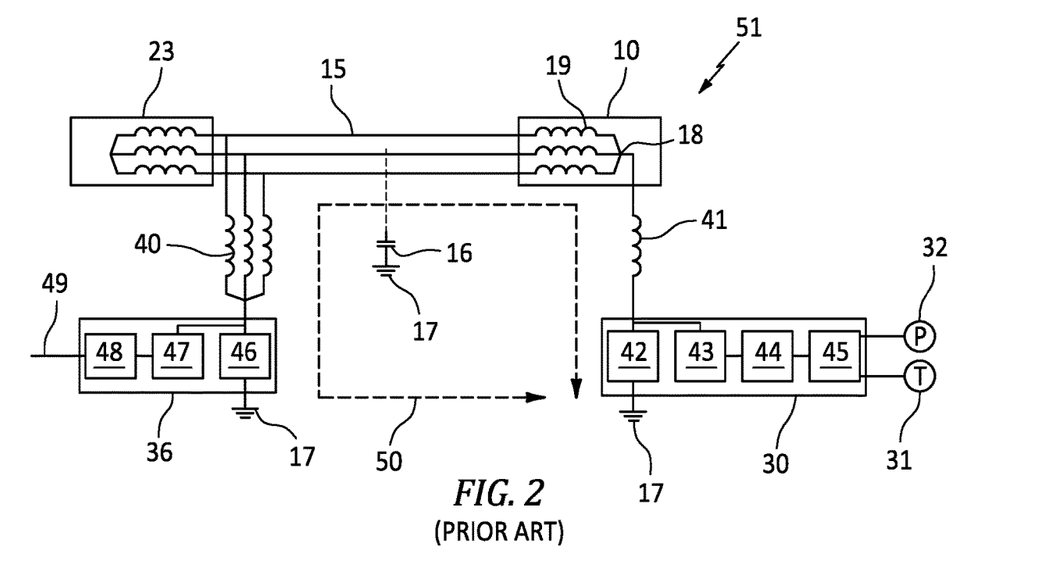
FIG. 2 is a schematic representation of an electrical diagram of a communication system of a downhole gauge.

Referring now to FIG. 2, there is shown a depiction of a typical form of a prior art communication system 51 in which data and power is transferred via the motor star point 18 of the motor windings 19. There are numerous providers of downhole gauges offering this type of system and the following illustrative description is not limiting in its scope.

In the ideal case of a motor 10 that is perfect sinusoidally wound, surface electric power 21 (FIG. 1) that is a perfect sinusoidal drive voltage and a balanced cable 15, the motor star point 18 voltage would be zero with respect to ground 17. In practice, motor star point 18 is subject to voltage imbalances, voltage harmonics and transients from the voltage switching action of drive 22 (FIG. 1) (if used).

Still referring to FIG. 2, a gauge surface unit 36 is connected via three inductors 40 attached to the cable 15 at the secondary side of transformer 23. The downhole gauge 30 is connected to the motor star point 18 by an inductor 41. Inductors 40 and 41 provide sufficient reactance at the motor electrical power frequencies to limit the high motor voltages to a safe level within downhole gauge 30 and gauge surface unit 36. AC or battery power is applied to local power supply 46 which supplies direct current (DC) power between ground 17 and inductor 40, typically on the order of 100 volts DC. Downhole power supply unit 42 recovers the power between inductor 41 and ground 17 and converts it to voltages required by the remaining electronic equipment. Downhole power supply unit 42 preferably draws a steady current. Signal conditioning and digitizing unit 45, using techniques well known to those practiced in the art, converts an analog output from temperature sensor 31 and pressure sensor 32 to a digital form. Here a pressure sensor 32, such as a strain gauge device, and a temperature sensor 31, such as a thermocouple, are representatively shown as inputs to digitizing unit 45. Processor unit 43 receives the digital data from digitizing unit 45, and optionally processes it such as by calibration and filtering, and packages the measurements and status information into telemetry packets, which are then modulated by processor unit 43 and impressed upon inductor 41 such as by known techniques of varying the supply current according to binary ones and zeroes and communicated via a telemetry system.

In gauge surface unit 36, demodulation unit 47 demodulates the gauge data. Processor unit 48 validates the demodulated data and makes it available to controller 24 (FIG. 1) using a known serial connection and data protocol such as Modbus. Depending upon the sophistication of the drive 22, two-way communication may be implemented, with the possibility to change the selection of gauge data being transmitted uphole in each telemetry frame via a telemetry system.

The communication system 51 of FIG. 2 circulates gauge power and data in loop 50, wherein gauge current flows equally through the three motor cable conductors of cable 15 and the motor windings 19. The current returns through a distributed ground 17, primarily comprising the metallic motor, seal and pump construction and the production tubing. Cable 15 may also typically comprise a metallic cable armor which also provides an electrically conductive return path. This electrically conductive metalwork is earthed at the wellhead 6 (FIG. 1) and also where it may touch the casing 2 at various points in the borehole. The water content of the borehole fluid may also provide a return path between this metalwork and the casing.

Still referring to FIG. 2, the voltage from the secondary side of transformer 23 applied to the motor 10 is differential, that is it is differential between individual phases. There is no earth connection. The gauge power and communication is common mode, that is it is between the phases as a whole and earth. In principle, there is no interaction between motor power and gauge power and data. In practice, and as described above, the motor star point 18 is not at zero motor voltage due to system imperfections. The large inductances of 19, 40 and 41 and the high capacitance 16 of the cable conductors to ground act as a low-pass filter. The distributed earth is of variable quality. Hence the common mode telemetry system experiences interference. Overall the effect of these factors is to severely restrict the gauge data bandwidth, typically to on the order of 10 bits/s.

Figure 3:
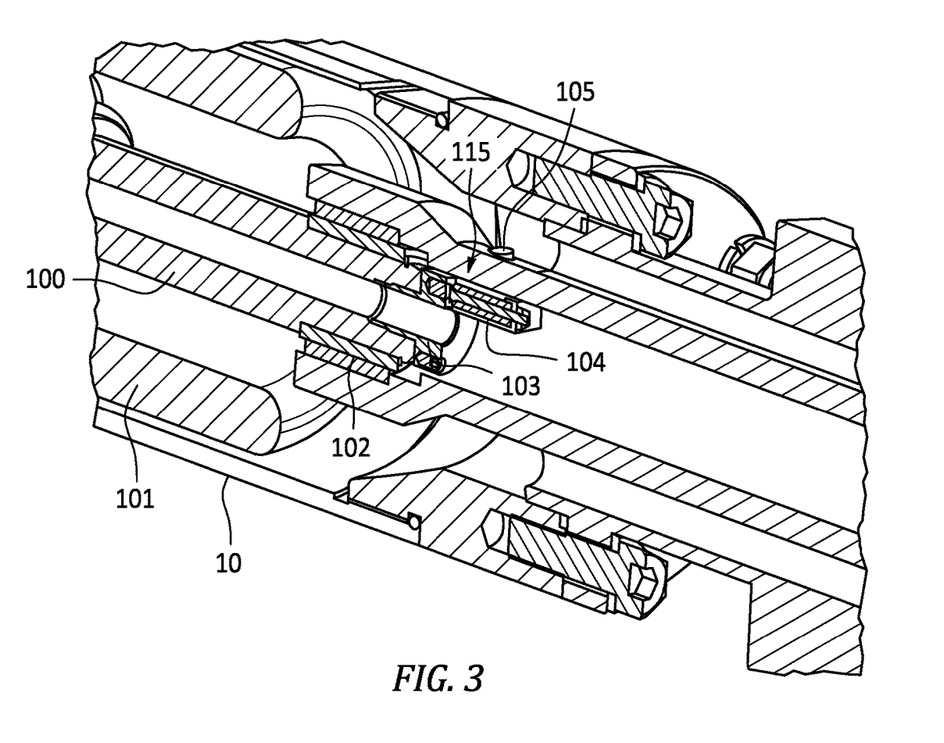
FIG. 3 is an isometric view of a rotation sensor system in partial section in accordance with an embodiment of the present disclosure.

Now with reference to FIG. 3, there is shown the bottom end of a representative submersible motor 10 in partial section view of an embodiment of the present disclosure. As will be described in more detail herein below, this embodiment advantageously utilizes the down hole gauge communications system described immediately herein above. The particular embodiment can be utilized with any motor 10, including submersible, and it should be appreciated by those skilled in the art that there are design and installation variations amongst the various manufacturers of these products which do not affect the scope of this disclosure.

Figure 4:
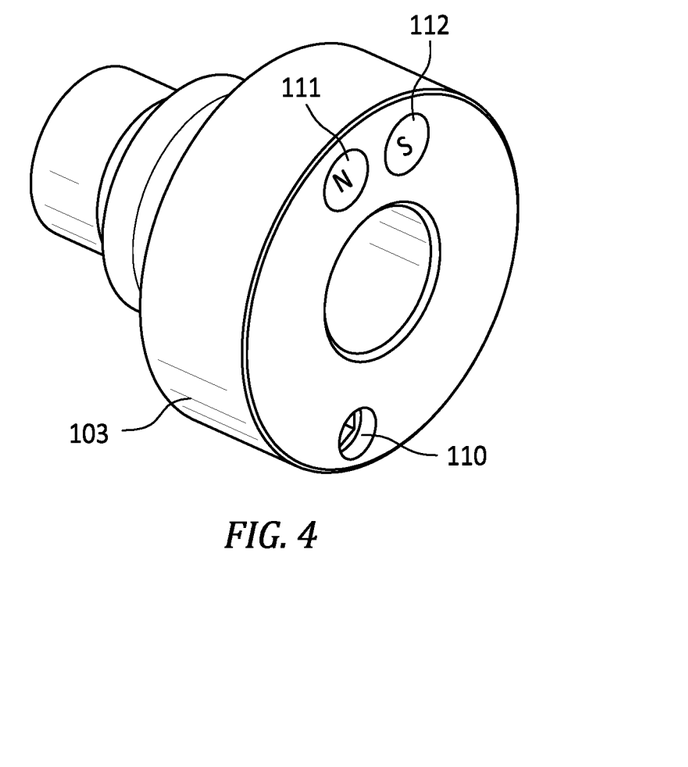
FIG. 4 is an isometric view of a transmitter assembly of a rotation sensor in accordance with an embodiment of the present disclosure.
Figure 5:
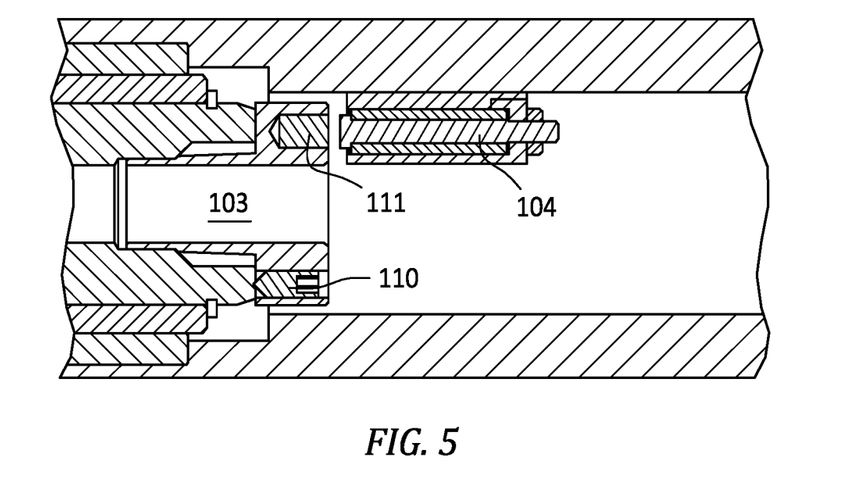
FIG. 5 is side view of a rotation sensor system in partial section in accordance with an embodiment of the present disclosure.

One embodiment of a rotational sensor system 115 of the present disclosure is best described with reference to FIGS. 3, 4 and 5, wherein motor shaft 100 of motor 10 passes the end turns of the motor winding 101 (similar to motor windings 19 in FIG. 2) and is supported by bearing 102. Motor shaft 100 can in some embodiments be hollow for the purposes of circulating the oil that fills the motor, though in some cases this benefit is foregone and the shaft is solid. Rotation transmitter assembly 103 is fastened to the end of the motor shaft 100. It is screwed in to the end of the shaft and secured with a grub screw 110 (or set screw) or a pin as shown in detail in FIGS. 4 and 5, although other means of attachment may be made without departing from the scope of the present disclosure. In the embodiment shown, the rotational transmitter assembly 103 is fully round and smooth and so does not create appreciable drag as it rotates with the shaft. Rotational transmitter assembly 103 may advantageously be made of an essentially non-magnetic material such as stainless steel. Two magnets 111, 112 are inserted into its end face exposing opposite polarities wherein magnet 111 is shown having a North polarity facing outward and magnet 112 is shown having a South polarity facing outward. Magnets 111, 112 are preferably spaced close enough together that their flux passes from one to the other in a loop as will be more fully described herein below.

Figure 6:
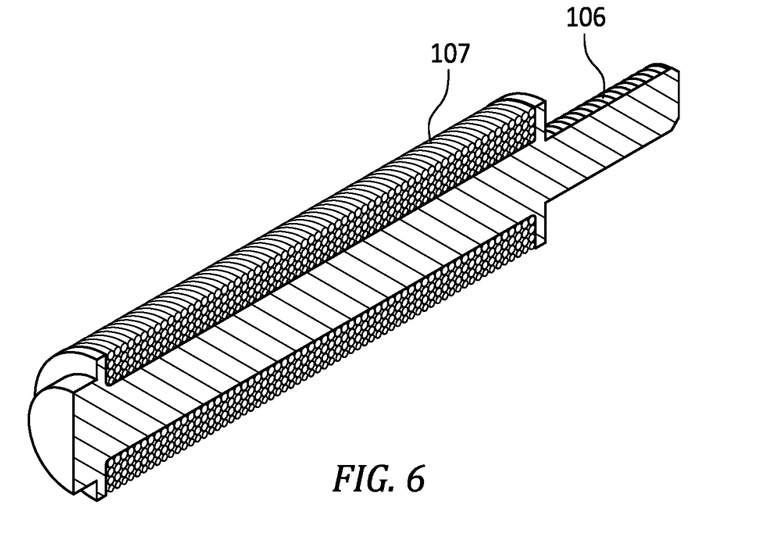
FIG. 6 is an isometric view of a receiver of a rotation sensor system in partial section in accordance with an embodiment of the present disclosure.
Figure 7:
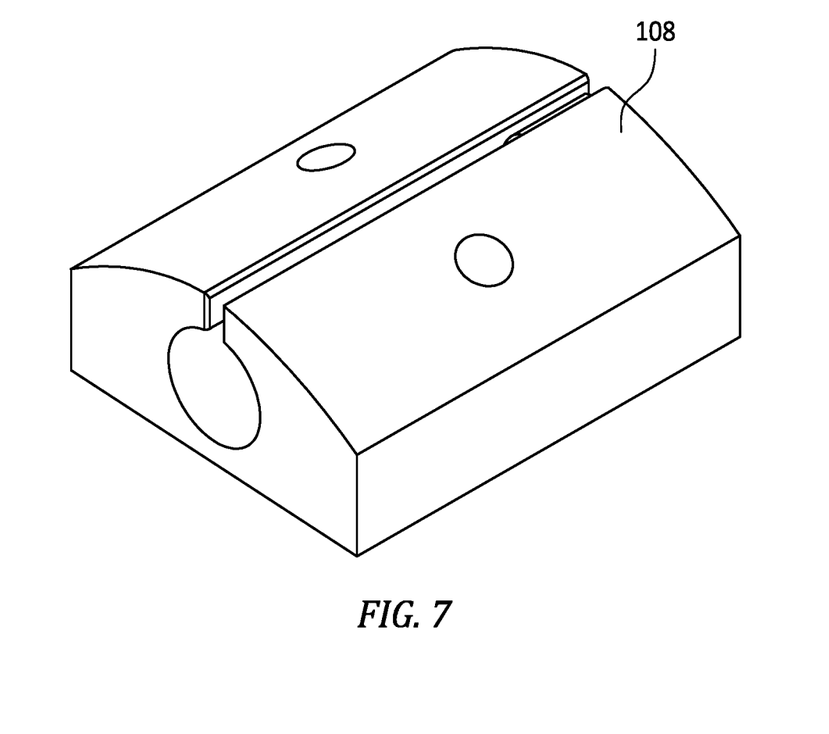
FIG. 7 is an isometric view of a receiver holder of a rotation sensor system in partial section in accordance with an embodiment of the present disclosure.

Receiver assembly 104 is secured to a stationary portion of the body of motor 10, and in this particular embodiment is secured by screw 105 into the receiver assembly holder 108 (FIG. 7) and is held stationary with respect to rotating motor shaft 100. Referring briefly to FIG. 6, receiver assembly coil 107 is wound on a former 106. Former 106 is preferably comprised of a magnetic material such as ferrite, carbon steel or bonded iron powder, in order to concentrate flux from the rotational transmitter assembly 103. It should be appreciated by those skilled in the art that receiver assembly holder 108 may be comprised of a non-magnetic material or a magnetic material shaped to enhance the sensitivity of the rotational transmitter assembly 103.

Figure 8:
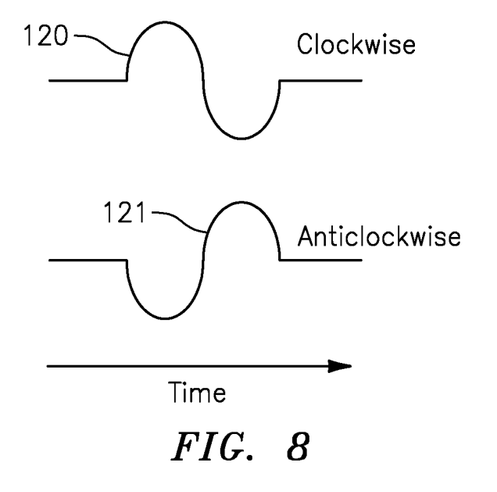
FIG. 8 is a graphical representation of the signal output a rotation sensor system in accordance with an embodiment of the present disclosure.

In operation, as the magnets 111, 112 of rotational transmitter assembly 103 rotate on motor shaft 100 and pass the receiver assembly coil 107 (FIG. 6), a small voltage (electromotive force) will be induced, as is well known from elementary electromagnetic theory. The instantaneous polarity of the voltage will depend on the polarity of the magnet (111 or 112) facing the receiver assembly coil 107, the coil connection to receiver circuitry and the handedness of the coil turns thereon. Referring to FIG. 8, there is shown representative output signals in the form of voltage signals versus time from the rotational sensor system 115 for one revolution of motor shaft 100 in accordance to a certain set of connections as discussed herein above. With the motor shaft 100 turning clockwise (typically with the convention of looking up hole or from the right in FIG. 3), output signal 120 shows a positive voltage first as one magnet passes over receiver assembly coil 107, followed by a negative voltage as the second magnet passes over the receiver assembly coil. Conversely with the motor turning anti-clockwise, output signal 121 shows a negative voltage first as one magnet passes receiver assembly coil 107, followed by a positive voltage as the second magnet passes over the receiver assembly coil. It should be appreciated by those skilled in the art that if surface electric power 21 is flowing to the motor 10 and no output signals 120, 121 are present that a stuck condition may be occurring. It is known in the art that pump 12 can become difficult to turn, or stuck, due to sand loading, rock ingestion and other known reasons. By placing the magnets 111, 112 close together, and within a typical range of operating speeds, the voltage signals (or current signals) will appear as a doublet signal. In so doing, the doublet signal cannot be confused with the large gap in the time between positive and negative pulses corresponding to the alternative but longer spacing between magnets around the circumference of rotational transmitter assembly 103. Simple circuitry (not shown) such as positive and negative voltage comparators and logic gates as may be envisioned by one skilled in the art, that will detect the sequence of positive and negative voltage signals, and their rate of occurrence. Depending on the details of the particular embodiment and the magnetic flux path, the signals may not be simple doublets and can, for example, be positive or negative pulses. It should be appreciated that embodiments of the present disclosure advantageously provide a means of determining the rotational direction of shaft 100, its rotational speed as well as determining a stuck condition (no rotation). Although the rotational transmitter assembly 103 of the rotational sensor system 115 is shown attached to motor shaft 100, it may be attached to any other shaft or rotating part of the ESP system such as a coupling or pump shaft (not shown). It will further be appreciated that there are several simple variations of this embodiment. For example, the magnets may be inserted directly into holes drilled in the shaft end if the shaft is made of non-magnetic material. In another example the magnets may be installed radially (transversely to the shaft axis) with an opposing radial receiver coil. In addition, and to improve signal strength, the magnetic reluctance of the transmitter-receiver circuit can be reduced by incorporating magnetic material such as steel within the transmitter behind the magnets.

A further advantage of this particular embodiment of the present disclosure is that it only requires one wire connected to receiver assembly coil 107 of receiver assembly 104 to pass from the motor 10, which can be oil-filled, at borehole pressure into the gauge electronics at atmospheric pressure. The other end of receiver assembly coil 107 can be connected to the housing of downhole gauge 30 and so it uses the existing metallic continuity to be accessible to the gauge electronics. In ordinary industrial applications known Hall effect sensors provide effective receivers, but in the present application their submersion in oil at high downhole pressure and temperature can severely limit the life of these components. In addition, several connections may be needed for their operation, each being a potential point of failure. However, Hall sensors have the benefit that they respond to magnetic flux independent of the shaft speed, whereas a pickup coil electromotive force increases with shaft speed. Hall sensors can therefore be advantageous at low rotational speeds, and their use falls within the scope of embodiments of the present disclosure.

Figure 9:
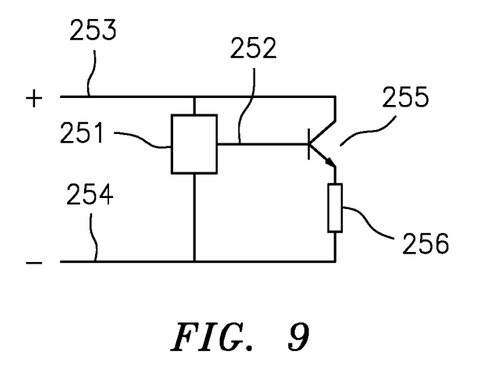
FIG. 9 is a circuit diagram of a Hall effect sensor in accordance with an embodiment of the present disclosure.

Now referring to FIG. 9, there is shown a circuit diagram of an embodiment of a Hall sensor 251 can be used in a novel manner to implement the direction sensing with only two wires connected to the gauge. Hall sensor 251 is of the known linear type, such as may be obtained from Allegro MicroSystems LLC, in which in the absence of a magnetic field passing through the sensor, the output 252 sits at approximately half the supply voltage on connections 253 and 254. The supply voltage is provided by the gauge and ordinarily the output 252 would form a third connection to the gauge for measurement. The output signal voltage on output 252 will increase or decrease according to the polarity of the magnetic flux passing through the sensor. However, in the given embodiment, output 252 is connected to transistor 255 and (emitter load) resistor 256. When output 252 increases, the current through resistor 256 will increase and conversely if output 252 decreases, the current through resistor 256 will decrease. As will be evident to one ordinarily skilled in the art, the resistor 256 current is drawn through the connections 253 and 254. Hence when magnetic flux passes through Hall sensor 251 the supply current will increase or decrease according to its direction. In this way, only connections 253 and 254 need to pass into the gauge electronics compartment. One of these connections can potentially make use of the equipment metalwork as a conductor. In a practical implementation the circuitry of FIG. 9 would be encapsulated to provide protection from the motor oil and contamination, using a material such as epoxy. Referring to FIG. 4, the same axially mounted magnet 111, 112 configurations may be used, with the Hall sensor 251 positioned in the same location as receiver assembly 104 in FIG. 5. Alternatively, the magnets may be disposed radially on motor shaft 100 and the Hall sensor 251 located radially opposite. It has been discovered that the idealized output signals 120 and 121 in FIG. 8 are readily achieved over a very wide speed range in such an embodiment.

In another embodiment, although not shown, a receiver assembly 104 whose inductance is measured, such as by impedance measurement or by use as one of the frequency-determining elements in an electronic oscillator, which are methods known to one ordinarily skilled in the art, can be used to sense variation in the magnetic reluctance of the motor shaft 100 caused by notches or other magnetically permeable variations positioned thereon.

The embodiment of rotational sensor system 115 described immediately herein above is but a single embodiment of the present disclosure for implementing an encoder signal falling within the scope of this disclosure that measures rotational parameters to provide information relevant to shaft rotation and speed. While it is an important discovery, the particular embodiment of rotational sensor system 115 discussed directly herein above does not however provide an incremental or absolute shaft rotation angle. Such shaft angle information may be useful in determining whether motor shaft 100 has moved between attempted starts. This information would be helpful in the event of a stuck pump as will be described more fully herein below.

Such angular position information may also be useful, for example, if a higher-speed telemetry system is available or for small motors where the drive itself is placed downhole.

Figure 10A:
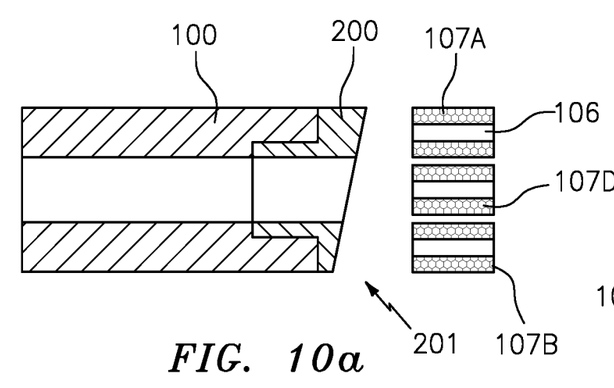
FIG. 10a is an illustration of a side view of an encoder of a rotation sensor system in accordance with an embodiment of the present disclosure.
Figure 10B:
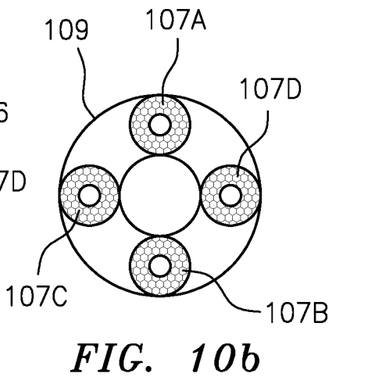
FIG. 10b is an illustration of an end view of a receiver of an encoder of a rotation sensor system in accordance with an embodiment of the present disclosure.

Referring now to FIGS. 10a and 10b, there is shown an embodiment of a rotational sensor, or encoder, 201 of the present disclosure that measures rotational parameters to provide information relevant to shaft rotation and speed as well as an absolute shaft angle encoder. A disc comprises a rotating transmitter 200 and is comprised of a magnetically permeable material, wherein such magnetically permeable material may include carbon steel, is attached to the end of motor shaft 100. Rotating transmitter 200 has an end face at an angle relative to the transverse section of the motor shaft 100 In an alternative embodiment, rotating transmitter 200 may be incorporated into motor shaft 100 by simply forming a suitable angled face across the end of the motor shaft. In addition, if it is desired to minimize drag, the angled end face may be restored to its normal square end using a complementary wedge of essentially non-magnetic material such as stainless steel. Best shown with reference to FIG. 10b, receiver assembly 109, mounted in a manner similar to that described herein above with reference to receiver assembly 104, comprises four coils 107A, 107B, 107C, 107D opposing the transmitter 200 wherein the coils are disposed evenly about the circumference of the receiver assembly. It should be appreciated that the inductance of each coil 107A, 107B, 107C, 107D will vary with its distance, from the face of the transmitter 200, or the gap formed therebetween, which varies sinusoidally with shaft rotation. In operation, and with reference to any two adjacent coils, the inductance of one will vary in sympathy with the sine of the shaft angle and the other will vary in sympathy with the cosine of the shaft angle. In such an embodiment of the present disclosure, using the output of the sine and cosine, the absolute shaft angle relative to a reference point may readily be deduced. With reference to coils that are diametrically opposed on receiver assembly 109, their inductances will vary together but will be 180 degrees apart, so as one inductance increases the other will reduce. Although the transmitter 200 of the encoder 201 is shown attached to motor shaft 100, it may be attached to any other shaft or rotating part of the ESP system such as a coupling or pump shaft (not shown).

Figure 11:
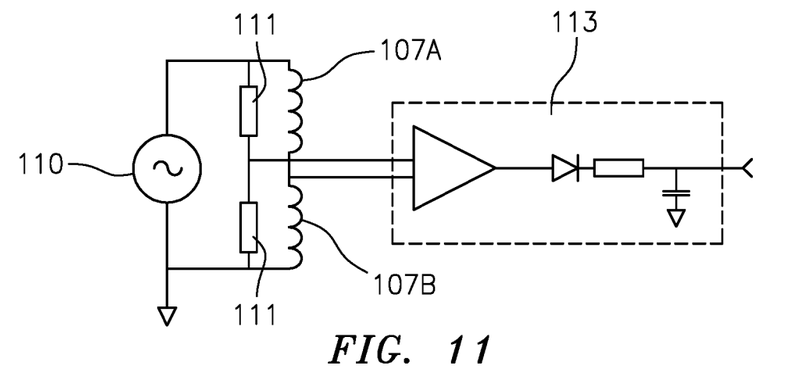
FIG. 11 is circuit diagram of the receiver coils of an encoder of a rotation sensor system in accordance with an embodiment of the present disclosure.

Now referring to FIG. 11, a circuit diagram shows how the coils 107A and 107B may be wired in series as a half-bridge and driven by AC voltage, typically in the tens or hundreds of kilohertz range depending on anticipated shaft rotational speed. A similar circuit (not shown) may be used for coils 107C and 107D. The mid-point AC voltage will be amplitude modulated as the shaft rotates and the inductances vary. This amplitude modulated voltage is readily demodulated as in block 113 by rectification and low-pass filtering, giving the sine and cosine of shaft angle from the respective pairs of coils. These signals may be converted to angle by means of a phase locked loop well known in the processing of resolver signals and digital radio receivers.

Having regard to the limited bandwidth system of typical downhole gauges 30 as hereinbefore outlined, it is not feasible to transmit the shaft angular position in real-time at a rate needed by variable speed drives for vector control. For example, a motor turning at 3600 rpm would typically need at least ten readings per rotation or 600 measurements per second to enable such control. However, utilizing embodiments of the present disclosure, the direction and speed can be transmitted every ten seconds or so and the shaft angle may be transmitted from time-to-time as needed wherein such transmission rates are easily accommodated by the communication system 51 (FIG. 2) of existing downhole gauges 30 (FIG. 1).

One particularly useful aspect of embodiments of the present disclosure includes that during make-up of the downhole assembly at surface before running into the borehole, the motor shaft 100 may be turned manually and the gauge readings from the encoder 201 or rotational sensor system 115 can be used to confirm the correct measurement of direction.

Figure 12:
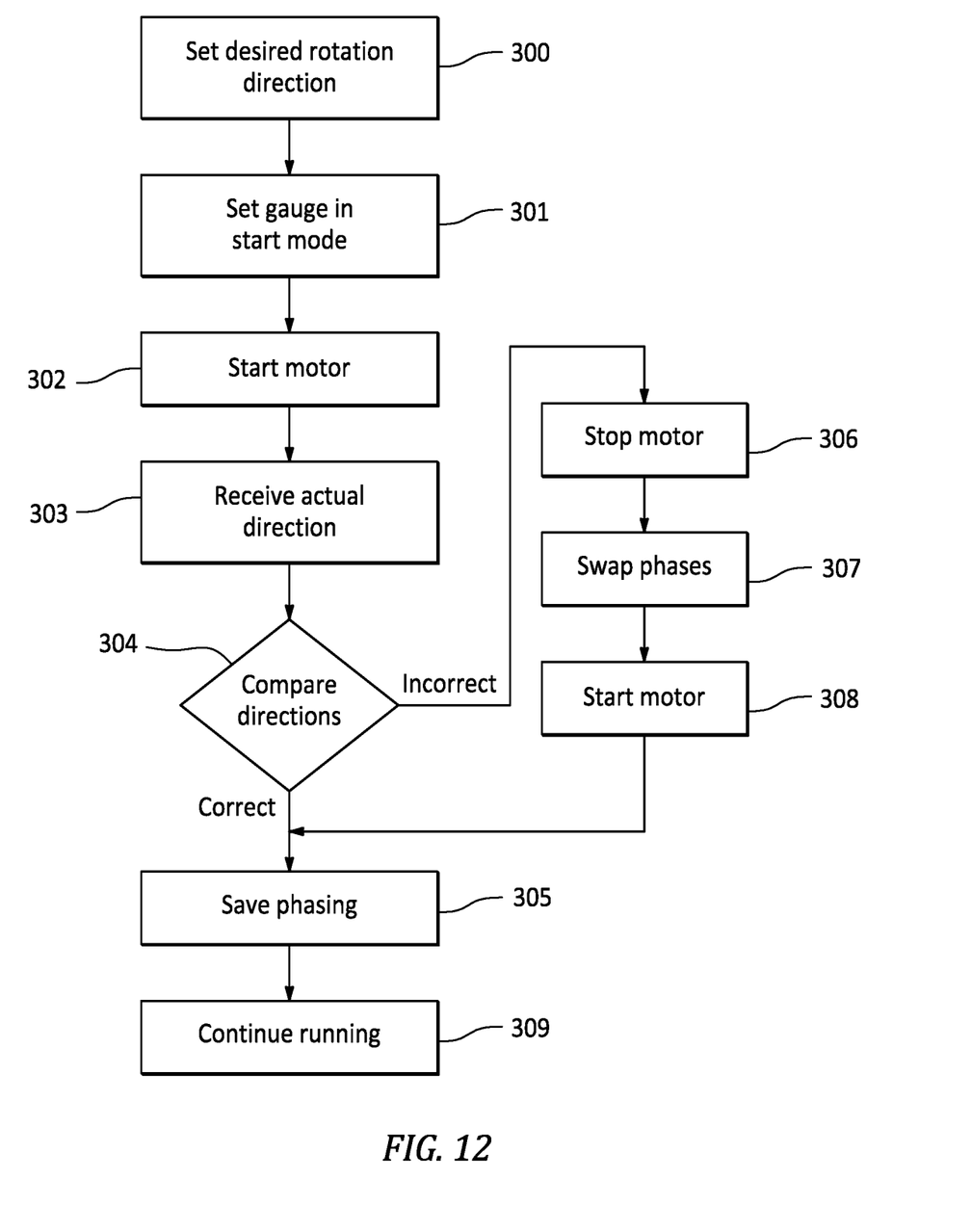
FIG. 12 is a flow chart of a method of operating a downhole pumping system in accordance with an embodiment of the present disclosure.

Now referring to FIG. 12, there is a flowchart showing the operation of an embodiment of the present disclosure with reference to the various figures described herein. In step 300, drive 22 is set to output the motor voltage phase sequence to what is intended to be the forward rotational direction, where forward rotational direction is the correct sense for pumping if the system is connected as intended or the opposite rotational direction if injection is intended. The drive can be of known vector or scalar type or a simple switchboard operating from a fixed power supply. As described herein above, the required direction of rotation will be determined by the pump and motor configuration as well as the desired effect, i.e. lifting or injection. In step 301, downhole gauge 30 is put into start-up mode where it transmits status data bits for direction of rotation and whether the motor shaft 100 of motor 10 is rotating. In a case where downhole gage 30 is in start-up mode and there is no indication that motor shaft 100 is rotating, a stuck condition can be determined and a rocking start sequence can be commenced as disclosed herein below. As described herein above, downhole gauge 30 may also transmit pressure and temperature measurements during the start-up mode. During this step, readings such as vibration might be omitted in order to make best use of the limited bandwidth system. In step 302 the motor is started in using the output voltage from drive 22 configured to be in the what is intended to be the forward rotational direction. In step 303 controller 24 monitors the downhole gauge 30 readings during starting of the motor 10. After controller 24 starts the motor 10 and observes the downhole gauge 30 readings to determine whether rotation is detected, and if rotation is detected, the actual rotational direction. In step 304, and preferably once enough time has passed to be confident of the readings from the downhole gauge 30, for example after several telemetry updates, perhaps a minute, the controller 24 compares the readings from the downhole gauge with the intended operating direction. If they are the same, the downhole gauge 30 is put back into normal mode and the controller 24 indicates to the operator that starting was successful and in step 305 the phase settings are saved. If in step 304 the readings from the downhole gauge 30 and the intended forward rotational direction are not the same, i.e. the shaft is turning in an opposite rotational direction to the intended (or desired) forward direction, the controller 24 stops the motor in step 306, and in step 307 drive 22 outputs the motor voltage phase sequence for the opposite rotational direction and in step 308 controller 24 restarts motor 10 in the opposite direction. In step 304 controller 24 again checks the downhole gauge 30 readings to confirm correct direction or to signal a fault. If it is correct, controller 24 preferably saves the correct phase sequence into storage, such as non-volatile memory storage, in step 305 so that it can always start correctly the first time after any restartable surface alarm or power loss, or after a planned stop. Once the correct phase sequence has been saved drive 22 takes over the control of motor 10 in step 309.

Figure 13:
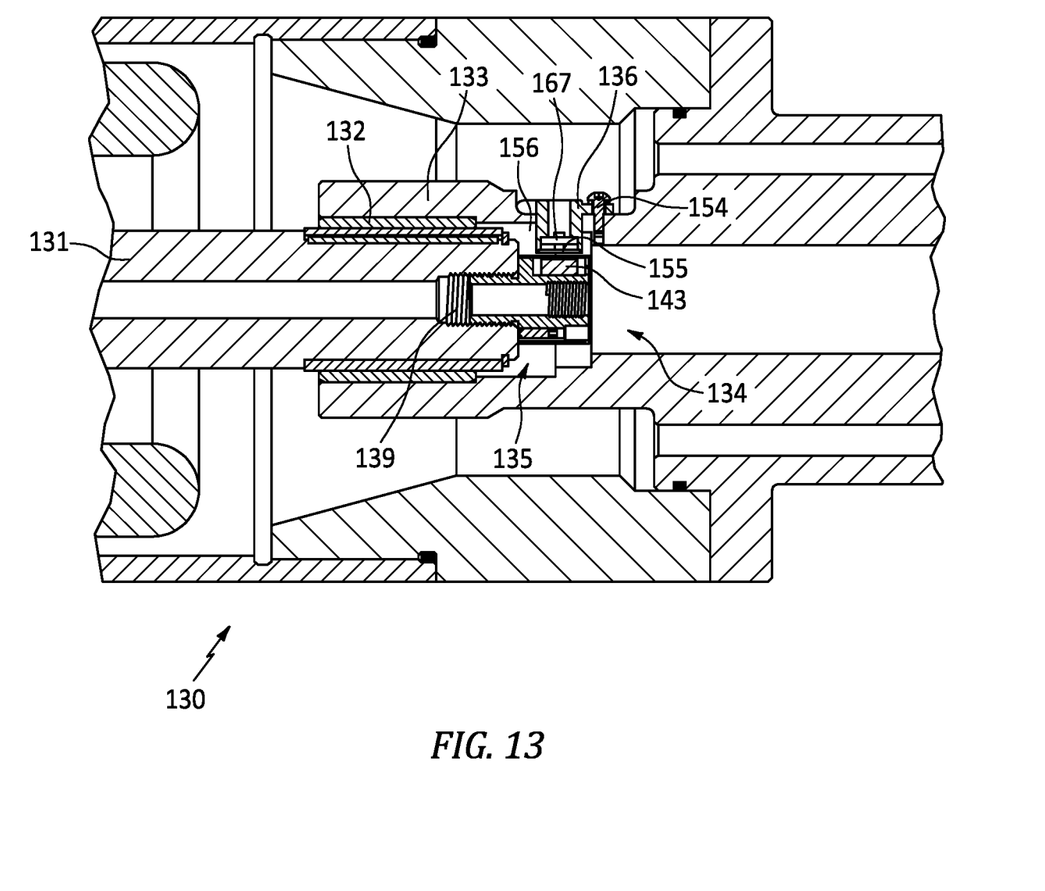
FIG. 13 is side view of a rotation sensor system in partial section in accordance with an embodiment of the present disclosure.
Figure 14:
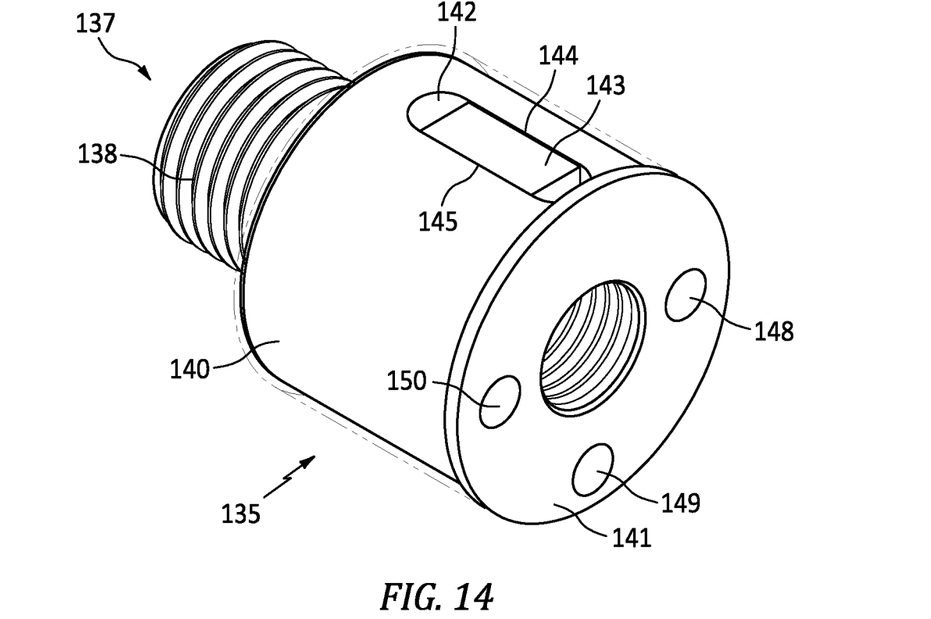
FIG. 14 is an isometric view of a rotational transmitter assembly in accordance with an embodiment of the present disclosure.
Figure 15:
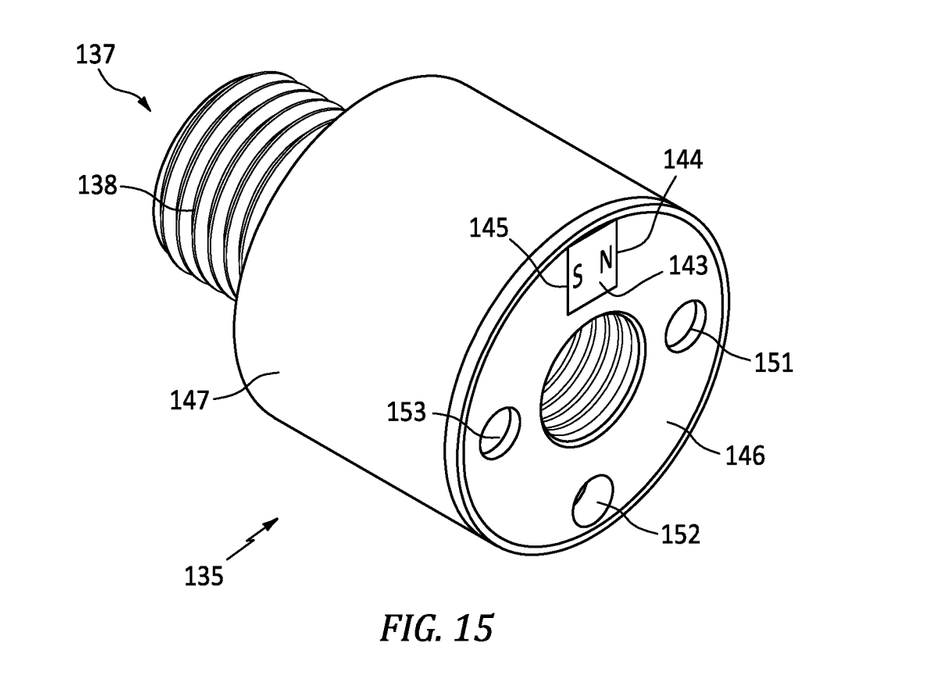
FIG. 15 is an isometric view of the rotational transmitter assembly of FIG. 14 in partial section in accordance with an embodiment of the present disclosure.

Referring now to FIG. 13 there is shown an alternative embodiment of motor 130 in accordance with the present disclosure. Motor 130 includes a shaft 131 supported in part by bearing 132 captured within housing 133. In this particular embodiment, rotational sensor system 134 is comprised of rotational transmitter assembly 135 and stationary sensor assembly 136. With further reference to FIGS. 14, 15, the detail of rotational transmitter assembly 135 can be seen. Rotational transmitter assembly 135 includes a generally cylindrical body 137 having male threads 138 positioned on a first end to threadably engage with female threads 139 on an inside diameter of shaft 131 to fix the rotational transmitter assembly to the shaft. Rotational transmitter assembly 135 further includes a circumferential face 140 on an outer surface of the outer diameter of body 137, a lip 141 positioned on the outer diameter of an end face 146 of the body, at least one pocket 142 positioned within the circumferential face and a magnet 143 positioned within the pocket and approximately flush with the circumferential face. Pocket 142 has its longitudinal length axially aligned with the axial length of cylindrical body 137 such that the magnetic field of magnet 143 is presented perpendicular to the sensor of stationary sensor assembly 136. It should be appreciated by those skilled in the art that rotational transmitter assembly 135 is does not require an external power source and provides a reliable signal to stationary sensor assembly 136. Magnet 143 can be permanent magnet comprised of a rare earth bar magnet having a first polarity 144 and a second polarity 145 positioned on opposite sides of pocket 142 along the circumferential face 140. For instance, first polarity 144 can be a North polarity and second polarity 145 can be a South polarity. With magnet 143 positioned flush with the circumferential face 140, outer cover 147 both captures the magnet within the cylindrical body and prevents it from contacting, and possibly damaging, stationary sensor assembly 136. In alternative embodiments, magnet 143 can be affixed with pocket 142 using a suitable adhesive or potting material. Cylindrical body 137 of rotational transmitter assembly 135 may advantageously be made of an essentially non-magnetic material such as stainless steel. It should be noted that the length of magnet 143 in the direction parallel to shaft 131 is selected to allow for thermal growth of the shaft relative to the housing 133 while maintaining the ability for stationary sensor assembly 136 to sense the rotating magnetic field as will be disclosed in more detail herein after. With specific reference to FIG. 15, there is shown the rotational transmitter assembly of FIG. 14 in partial section taken approximately the center of magnet 143. It shows outer cover 147 positioned over circumferential face 140. Outer cover 147 is a hollow cylinder and can be comprised of a non-magnetic material such as stainless steel, aluminum or the like. Rotational transmitter assembly 135 is prepared for operation by positioning magnet 143 within pocket 142, sliding outer cover 147 over male threads 138 and over circumferential face 140 and against lip 141. In an alternative embodiment an end plate (not shown) having the same diameter as lip 141 can replace the lip by installing the end plate on end face 146 using bolts (not shown) inserted into holes 148, 150 and threading them into threaded holes 151, 153 in body 137. When assemble as disclosed, outer cover 147 and lip 141 cooperate to capture magnet 143 within pocket 142 and the lip secures the outer cover on body 137. Outer cover 147 is further fully round and smooth and so does not create appreciable drag as it rotates with the shaft 131. A screw is threaded into threaded through-hole 152 and passes through body 140 to bear against the shaft end face and to thereby lock rotation transmitter assembly 135 to the shaft.

Stationary sensor assembly 136 is fixedly positioned to housing 133 by at least one screw 154. When assembled as disclosed, rotational transmitter assembly 135 rotates with shaft 131 within housing 133 and stationary sensor assembly 136 remains stationary relative to the shaft. Stationary sensor assembly 136 includes sensor 167 which can be comprised of any type of powered sensor capable of sensing a magnetic field such as a coil pick-up or a Hall effect sensor. It should be appreciated by those skilled in the art that the use of a Hall effect sensor, for sensor 167, that the current induced by magnet 143 is applied to the thin strip of metal producing a difference in electric potential (voltage) between the two sides of the strip and that there exists no circuit to open or close increasing the reliability and speed over embodiments of the prior art. There exists a gap 155 between rotational transmitter assembly 135 and stationary sensor assembly 136 sufficient to provide clearance between the two and allow for tolerances and radial thermal expansion of the shaft but small enough for the sensor assembly to detect the rotating magnetic fields. It should be further noted that, in this particular embodiment, there further exists a gap 156 between stationary sensor 167 and the end of shaft 131. Gap 156 is selected to provide for thermal growth of shaft 131 along its axial length relative to housing 133 without interfering with stationary sensor assembly 136.

In operation, as magnet 143 of rotational transmitter assembly 135 rotates on motor shaft 131 it will pass by sensor 167 of stationary sensor assembly 136 and a small voltage (electromotive force) will be induced by the magnetic fields disclosed above. The instantaneous polarity of the voltage will depend on the first polarity 144 and the second polarity 145 of magnet 143 and the rotational direction of shaft 131. Referring back to FIG. 8, there is shown representative output signals in the form of voltage signals versus time from the rotational sensor system 135 for one revolution of motor shaft 131. With the motor shaft 131 turning clockwise (typically with the convention of looking up hole or from the right in FIG. 14), output signal 120 shows a positive voltage first as first polarity 144 is sensed by sensor 167 of stationary sensor assembly 136, followed by a negative voltage as the second polarity 145 passes over the stationary sensor assembly. Conversely with the motor turning anti-clockwise, output signal 121 shows a negative voltage first as first polarity 144 is sensed by sensor 167 of stationary sensor assembly 136, followed by a positive voltage as the second polarity 145 passes over the stationary sensor assembly. It should be appreciated by those skilled in the art that if surface electric power 21 is flowing to the motor 10 and no output signals 120, 121 are present that a stuck condition may be occurring. It is known in the art that pump 12 can become difficult to turn, or stuck, due to sand loading, rock ingestion and other known reasons. Since first polarity 144 and second polarity 145 are relatively close together, and within a typical range of operating speeds, the voltage signals will appear as a doublet. In so doing, the doublet cannot be confused with the large gap in the time between positive and negative pulses corresponding to the alternative but longer spacing between the polarities around the circumferential face 140 of rotational transmitter assembly 135. Simple circuitry (not shown) such as positive and negative voltage comparators and logic gates as may be envisioned by one skilled in the art, that will detect the sequence of positive and negative voltage signals, and their rate of occurrence. Depending on the details of the particular embodiment and the magnetic flux path, the signals may not be simple doublets and can, for example, be positive or negative pulses. It should be appreciated that embodiments of the present disclosure advantageously provide a means of determining the rotational direction of shaft 131, its rotational speed as well as determining a stuck condition (no rotation).

Figure 16:
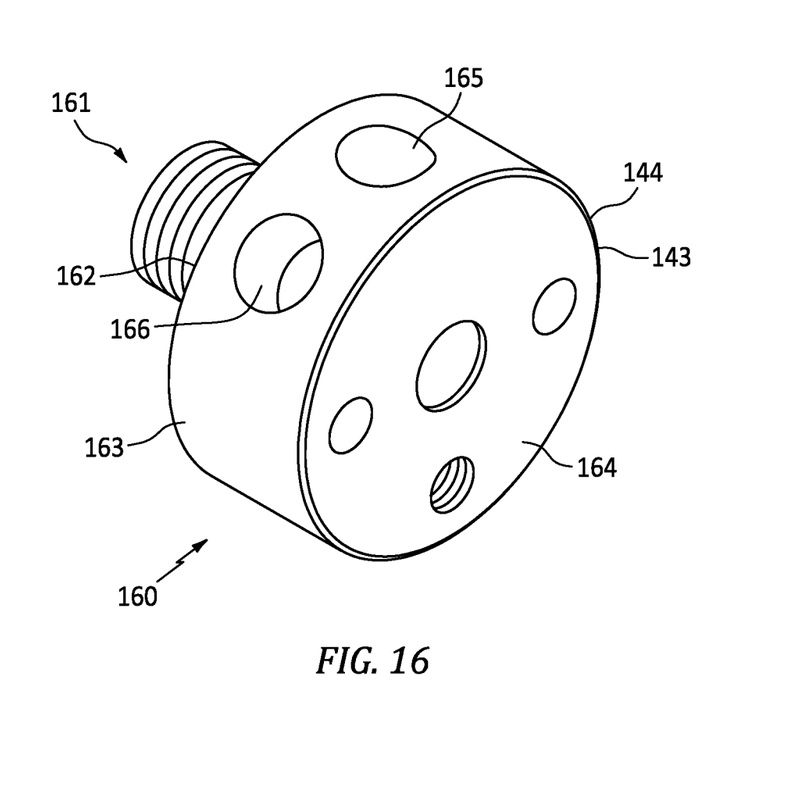
FIG. 16 is an isometric view of a rotational transmitter assembly in accordance with an embodiment of the present disclosure.

Referring now to FIG. 16, an alternative embodiment of rotational transmitter assembly 160 includes a generally cylindrical body 161 having male threads 162 positioned on a first end to threadably engage with female threads 139 on an inside diameter of shaft 131 to fix the rotational transmitter assembly to the shaft. Rotational transmitter assembly 160 further includes a circumferential face 163 about an outer diameter of body 161, end face 164 of the body, a first pocket 165 positioned within the circumferential face and a second pocket 166 positioned within the circumferential face. First pocket 165 and second pocket 166 are positioned at different angular positions on along the circumferential face and are configured to receive permanent magnets 111, 112 (FIG. 4) positioned within the pockets and approximately flush with the circumferential face. Magnet 111 can be a North polarity and magnet 112 can be a South polarity. Embodiments include a plurality of pairs of pockets with the magnets arranged with their polarities in an alternating fashion such that no one polarity is positioned adjacent to the same polarity. Body 161 of rotational transmitter assembly 160 may advantageously be made of an essentially non-magnetic material such as stainless steel. It should be noted that the diameter of magnets 111, 112 are selected to allow for thermal growth of the shaft relative to the housing 133 while maintaining the ability for stationary sensor assembly 136 to sense the rotating magnetic field disclosed in more detail herein before. Although not shown, rotational transmitter assembly 160 can include outer cover 147 (FIG. 15) positioned over circumferential face 163 to protect magnets 111, 112 and maintain their position within first pocket 165 and second pocket 166. Rotational transmitter assembly 160 operates similar to that described herein above, with reference to rotational transmitter assembly 135, producing a magnetic field that is sensed by stationary sensor assembly 136 and advantageously providing a means of determining the rotational direction of shaft 131, its rotational speed as well as determining a stuck condition (no rotation).

It should be appreciated by one skilled in the art that variations of the processes and apparatuses described herein above may be easily accomplished and remain within the scope of embodiments of the present disclosure. For example, in an alternative embodiment the downhole gauge may be configured to automatically switch into starting mode whenever it senses that the motor is not turning and revert to normal mode a few minutes after starting is successful, thus avoiding the need for communication to the downhole gauge from surface. Two binary bits from the apparatus of the present disclosure are sufficient to indicate rotation and direction. The bits occupy very little bandwidth and might be transmitted in all or occasional telemetry frames through communications system 51, without a special mode.

In certain embodiments, the controller 24 of the present disclosure is capable of advising an operator of incorrect rotational condition of the motor 10 and further to allow the operator to decide whether to stop and restart the motor, rather than a fully automated process. An example of where this method embodiment is useful is if it is preferred to physically rewire the phase connections at the drive so that the pump will start correctly when the controller is left to operate in its normal rotational direction.

As set forth herein above, it is known in the art that it is sometimes difficult to start a pump's rotational movement, such as when it is filled (or partially filled) with sand. In such a stuck condition, the control system can determine a zero rotation condition (i. e. the shaft is not rotating even though the control system is commanding it to rotate). As is known in the art, a rocking start is a sequence of alternatingly first rotational direction starts and second rotational direction starts at different levels of intensity and is used to try and free the pump of sand. It should be noted that the first rotational direction starts, and the second rotational direction starts are opposite rotational directions from one another. Excessive starting intensity and rocking risks damaging the pumping system including breaking of the motor or pump shaft. In such cases, aspects of the present disclosure advantageously allow an operator to know if the pump shaft has moved during a start attempt and provides a further indication of the severity of the "sticking" during a stuck condition and how to proceed such as extending, changing or stopping the rocking sequence. In embodiments related to encoder 201, the shaft encoder transmitting the shaft angle at 10-20 second intervals to the controller will permit such information to be interpreted.

As herein described herein above with respect to the prior art control of downhole pumping systems, prior art downhole gauges do not have the bandwidth to transmit shaft angle using known sensors at a sufficiency high rate for sensor control of the motor. In accordance with embodiments the present disclosure described herein above, an analogue signal indicating shaft angle can be transmitted to surface control systems by methods as now described. By way of an example, progressive cavity pumps rotate at only a few hundred rpm, therefore the shaft rotation rate is only a few Hertz (Hz). Still considering the same example, when the shaft is rotating at 240 rpm the rate is 4 Hz. This rate may be low enough for a downhole gauge to transmit a (preferably sinusoidal) modulation, in this example at 4 Hz, of the gauge supply voltage or load current, and yet be separable from the sending of downhole data using a telemetry system by employing known filtering methods. The surface control equipment of the present disclosure can use the sinusoidal variation to determine the shaft angle, in conjunction with a rotational direction measurement as hereinbefore described. Alternatively, if a separate wire (not shown) is used for telemetry to surface, commonly known as an instrument or tubing encapsulated cable (TEC) cable, the telemetry can be at a relatively high rate and the modulation used to cover a wide range of shaft speeds. It is important to note, from a practical perspective, any such means of establishing a remote shaft sensor for motor control purposes must recognize that downhole equipment has a significant probability of failure over its lifetime and of infant mortality. In such situations the surface drive would need to have a fall-back sensorless method of control if a costly workover is to be avoided.

In addition to the advantages described herein above, during operation of the rotational sensor of the present disclosure, there exists many other conditions that the present disclosure may provide. For example, a stall condition of the motor shaft 100 may be detected, such as when the drive 22 loses control of a downhole permanent magnet motor. Warning of the stall condition from the present disclosure will allow the controller 24 to quickly stop the motor 10, preventing the motor rotor from overheating due to eddy currents inducted by the rotating stator field, and potential subsequent demagnetization. Another such advantage of embodiments of the present disclosure is the ability to detect backspin of the pump. It is known that in certain downhole pumping systems that in the event of power failure, or other types of failures, there exists a column of production fluid in the production tubing 3 above the pump 12. As the column of fluid drains back into the wellbore the pump may be driven backwards, or backspin, and drive the motor in the reverse direction thereby. In certain instances, such as in systems using permanent magnet motors, the motor may produce a hazardous voltage in a backspin condition. The backspin condition will continue, with the fluid column in the tubing draining, until the forces in the system come into balance. In addition, the operator may need to know when the draining and backspin has ceased, or at least slowed, before restarting the motor. Embodiments of the present disclosure provide an operator with such rotational parameters as shaft movement, direction and speed, information of the motor and pump. Another advantage of embodiments of the present disclosure is the ability to detect frictional changes, which translate directly into acceleration and speed changes, within the system, such as a rubbing rotor. It should be appreciated by those skilled in the art that embodiments of the present disclosure employing encoder 201 provide angular shaft speed from which quadrant to quadrant (between coils 107A, 107B, 107C, 107D) variations, and acceleration thereby, may be determined that may be attributed to such frictional changes.

Although described herein with reference to synchronous permanent magnet motors, the present disclosure is particularly useful with asynchronous (induction) motors as used widely with ESPs. Such induction motors are typically operated by setting the electrical frequency and voltage of the motor. As is well known in the art, the speed of an induction motor operated at constant frequency will vary with load. Surface controllers can estimate motor speed in order to adjust the frequency to achieve a constant speed. However, a downhole rotational sensor system of the present disclosure will permit transmission of speed or speed change so as to give direct feedback to the drive 22.

While the foregoing is directed to embodiments of the present disclosure, other and further embodiments of the disclosure may be devised without departing from the basic scope thereof, and the scope thereof is determined by the claims that follow.

What is claimed is:

1. A sensor system for use with a motor comprising:
    a rotational transmitter assembly comprising:
        a cylindrical body having an axial length, a first end configured to fixedly attach to a shaft of the motor, a second end having an end face, a circumferential face positioned on an outer surface of an outer diameter of the cylindrical body and a pocket positioned within the circumferential face;
        a permanent magnet configured to produce a magnetic field positioned in the pocket substantially flush with the circumferential face;
        a hollow cylindrical cover configured to be positioned over the outer surface and over the permanent magnet and configured to secure the permanent magnet in the pocket;
        a lip positioned on the second end having a lip diameter larger than the outer diameter of the cylindrical body configured to secure the hollow cylindrical cover on the cylindrical body; and
    a stationary sensor assembly fixedly attach to a stationary portion of the motor comprising a sensor configured to sense the magnetic field, the sensor positioned proximate the circumferential face.

2. The sensor system of claim 1, wherein the pocket has a longitudinal length axially aligned with the axial length of cylindrical body, the permanent magnet has a first polarity positioned on a first side of the pocket and a second polarity positioned on a second side of the pocket wherein the first side of the pocket and the second side of the pocket are positioned at different angular positions along the circumferential face.

3. The sensor system of claim 2, wherein the longitudinal length of the pocket is configured to accommodate thermal growth of the shaft of the motor.

4. The sensor system of claim 3, further comprising a processing system being configured to determine one or more measures of a rotational parameter of the shaft.

5. The sensor system of claim 4, wherein the rotational parameter of the shaft is a rotational direction of the shaft.

6. The sensor system of claim 1 wherein the magnetic field is configured to produce a signal and wherein the signal is at least one doublet signal for every rotation of the shaft.

7. An apparatus, comprising:
    an electrical submersible pump assembly comprising:
        a motor, having a housing and a shaft, the shaft having a shaft axis, a first end and a second end;
        a pump, mechanically coupled to the first end; and
        a sensor system comprising:
            a rotational transmitter assembly comprising:
                a cylindrical body having an axial length, a first end configured to fixedly attach to the shaft of the motor, a second end having an end face, a circumferential face positioned on an outer surface of an outer diameter of the cylindrical body and a pocket positioned within the circumferential face;
                a permanent magnet configured to produce a magnetic field positioned in the pocket substantially flush with the circumferential face;
                a hollow cylindrical cover configured to be positioned over the outer surface and over the permanent magnet and configured to secure the permanent magnet in the pocket;
                a lip positioned on the second end having a lip diameter larger than the outer diameter of the cylindrical body configured to secure the hollow cylindrical cover on the cylindrical body; and
            a stationary sensor assembly fixedly attach to a stationary portion of the motor comprising a sensor configured to sense the magnetic field, the sensor positioned proximate the circumferential face; and
        wherein the sensor system is configured to output a signal related to a rotational parameter of the shaft.

8. The apparatus of claim 7, wherein the signal is produced by the magnetic field and comprises at least one doublet signal for every rotation of the shaft, the apparatus further comprising a processing system configured to receive the at least one doublet signal from the sensor system and configured to determine the rotational parameter of the shaft.

9. The apparatus of claim 8 wherein the rotational parameter of the shaft comprises any of a first rotational direction, a second rotational direction and a zero rotation condition.

10. The apparatus of claim 9, further comprising: a control system configured to cause the shaft to rotate in the first rotational direction, the control system configured to compare the first rotational direction to a desired rotational direction.

11. The apparatus of claim 10, wherein if the first rotational direction equals the desired rotational direction, the control system is further configured to continue to cause the shaft to rotate in the first rotational direction and wherein if the first rotational direction does not equal the desired rotational direction, the control system is further configured to cause the shaft to rotate in the second rotational direction.

12. An apparatus of claim 10, wherein, if the zero rotation condition is determined, the control system is further configured to cause the shaft to rotate alternatingly between the first rotational direction and the second rotational direction.

13. A method for controlling an electrical submersible pump assembly, comprising:
positioning a rotational transmitter assembly on a shaft of a motor wherein the rotational transmitter assembly comprises:
a cylindrical body having an axial length, a first end configured to fixedly attach to the shaft, a second end having an end face, a circumferential face positioned on an outer surface of an outer diameter of the cylindrical body and a pocket positioned within the circumferential face;
a permanent magnet having a magnetic field comprising a first polarity and a second polarity wherein the first polarity is opposite from the second polarity, the permanent magnet positioned in the pocket substantially flush with the circumferential face;
a hollow cylindrical cover configured to be positioned over the outer surface and over the permanent magnet and configured to secure the permanent magnet in the pocket;
a lip positioned on the second end having a lip diameter larger than the outer diameter of the cylindrical body configured to secure the hollow cylindrical cover on the cylindrical body;
positioning a stationary sensor on a housing of the motor proximate the circumferential face;
starting the motor;
attempting to sense a magnetic field using the stationary sensor; and
determining a rotational parameter of the motor.

14. The method of claim 13, wherein the attempting to sense the magnetic field comprises sensing sequentially the first polarity and the second polarity and wherein the determining the rotational parameter comprises determining a first rotational direction of the shaft.

15. The method of claim 13, wherein the attempting to sense the magnetic field comprises sensing sequentially the second polarity and the first polarity and wherein the determining the rotational parameter comprises determining a second rotational direction of the shaft.

16. The method of claim 13, wherein the attempting to sense the magnetic field comprises sensing no magnetic field and wherein the determining the rotational parameter comprises determining a zero rotation condition of the shaft.

17. The method of claim 14, further comprising comparing the first rotational direction to a desired rotational direction and causing the motor to continue to operate if the first rotational direction equals the desired rotational direction.

18. The method of claim 15, further comprising comparing the second rotational direction to a desired rotational direction and causing the motor to continue to operate if the second rotational direction equals the desired rotational direction.

19. The method of claim 16, further comprising causing the shaft to rotate alternatingly between a first rotational direction and a second rotational direction.

20. The method of claim 13, wherein the rotational parameter of the motor includes a stall condition, a backspin condition, a speed fluctuation condition, a stuck condition, a stopped condition, and a constant speed condition.

* * * * *